United States Patent
Herges et al.

(10) Patent No.: US 7,309,111 B2
(45) Date of Patent: Dec. 18, 2007

(54) PRESSURE MEDIUM-ACTUATED BRAKE SYSTEM OF A TRACTOR-TRAILER COMBINATION

(75) Inventors: Michael Herges, Korntal-Muenchingen (DE); Bernhard Schwendemann, Schorndorf (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 16 days.

(21) Appl. No.: 10/482,642

(22) PCT Filed: Jun. 14, 2002

(86) PCT No.: PCT/EP02/06559

§ 371 (c)(1),
(2), (4) Date: Dec. 13, 2004

(87) PCT Pub. No.: WO03/004333

PCT Pub. Date: Jan. 16, 2003

(65) Prior Publication Data

US 2005/0116533 A1 Jun. 2, 2005

(30) Foreign Application Priority Data

Jul. 5, 2001 (DE) .................. 101 32 493

(51) Int. Cl.
*B60T 13/00* (2006.01)
(52) U.S. Cl. .................. 303/7; 303/123
(58) Field of Classification Search .................. 303/3, 303/7, 8, 123, 124; 188/3 H, 3 R See application file for complete search history.

(56) References Cited

U.S. PATENT DOCUMENTS

| 4,436,347 A * | 3/1984 | Stumpe .................. 303/6.01 |
| 5,061,015 A * | 10/1991 | Cramer et al. .................. 303/7 |
| 6,062,652 A | 5/2000 | Eberling |
| 6,203,115 B1 | 3/2001 | Rosendahl |
| 2002/0167219 A1* | 11/2002 | Kemer et al. .................. 303/7 |
| 2004/0183364 A1* | 9/2004 | Marsh et al. .................. 303/7 |
| 2005/0029859 A1* | 2/2005 | Bensch et al. .................. 303/89 |

FOREIGN PATENT DOCUMENTS

| DE | 35 45 021 C2 | 6/1987 |
| DE | 196 53 264 A1 | 6/1998 |
| DE | 198 15 440 A1 | 10/1999 |
| EP | 0 588 256 A1 | 3/1994 |

* cited by examiner

*Primary Examiner*—Thomas Williams
(74) *Attorney, Agent, or Firm*—Crowell & Moring LLP

(57) ABSTRACT

The invention relates to a pressure medium-actuated brake system of a tractor-trailer combination comprising at least one first brake circuit and one second brake circuit. The inventive brake system contains a multiple-circuit braking power sensor, which is connected to a first compressed-air reservoir for the first brake circuit and to a second compressed-air reservoir for the second brake circuit. The brake system also contains an electronic controlling and regulating unit, a control valve device and a tractor protection valve, which can be brought into connection with at least one compressed-air reservoir and via which a brake pressure for a brake system of the trailer can be controlled. The invention provides that at least the multiple-circuit braking power sensor and the control device are placed in immediate proximity to one another and are combined to form a modular unit.

17 Claims, 2 Drawing Sheets

PRESSURE MEDIUM-ACTUATED BRAKE SYSTEM OF A TRACTOR-TRAILER COMBINATION

BACKGROUND AND SUMMARY OF THE INVENTION

The invention is based on a pressure-medium-actuated brake system of a tractor-trailer combination.

Such a brake system is known from the state of the art and contains at least a first brake circuit and a second brake circuit as well as the following:

a) a multiple-circuit braking power sensor connected to a first compressed-air reservoir for the first brake circuit and to a second compressed-air reservoir for the second brake circuit, for generating, as a function of the driver's desires, at least a first pneumatic control signal assigned to the first brake circuit, at least a second pneumatic control signal assigned to the second brake circuit, as well as electric signals;

b) an electronic controlling and regulating unit by which electric control signals can be generated as a function of the electric signals of the multiple-circuit brake power sensor;

c) a control valve device (pressure control module), which can be controlled with a first priority as a function of the electric control signals of the controlling and regulating unit and with a second priority as a function of the first pneumatic control signal and/or the second pneumatic control signal for generating a modulated control pressure for the trailer; and d) a tractor protection valve, which can be connected with at least one compressed-air reservoir and by which a supply pressure and, as a function of the modulated control pressure, also a brake pressure can be modulated for a brake system of the trailer.

In this case, two supply pressure conduits exist between the multiple-circuit brake power sensor and the first and the second compressed air reservoirs; two additional supply pressure conduits exist between the control valve device and the first and second compressed-air reservoir; and a control pressure conduit exists between the multiple-circuit braking power sensor and the control valve device. Since the multiple-circuit braking power sensor and the control valve device, as well as additional components of the brake system, are arranged at a certain spatial distance from one another, a plurality of relatively long pneumatic conduits and electric lines are obtained for the mutual connection of these components. As a result of the number and the length of the pneumatic conduits and electric lines, the number of required connection and fastening points is also increased, which has an unfavorable effect on the production and manufacturing costs of such a brake system. Furthermore, the leakage and error probability of the brake system also rises.

It is therefore an object of the present invention to further develop a pressure-medium-operated brake system of the above-mentioned type in such a manner that its production becomes simpler and more cost-effective. Furthermore, its reliability is to be increased.

According to the invention, this object is achieved in that at least the multiple-circuit braking power sensor and the control valve device (pressure control module) are arranged directly adjacent to one another and are combined into a constructional unit.

ADVANTAGES OF THE INVENTION

Because of the combination of the multiple-circuit braking power sensor and the control valve device in a constructional unit, a plurality of pneumatic conduits and electric lines can be significantly shorter or can be eliminated completely. Furthermore, some of the screwed connections and component fastenings can be saved, and plugs and cables can be combined. The brake system according to the invention can therefore be produced in a simpler and more cost-effective manner. Because of the smaller number of conduits, lines and fastening components, the probability of assembly errors and leakages is also reduced. The constructional unit can be installed as a preassembled module into different types of commercial vehicles, whereby lines or conduits cut into lengths and shaped specifically for one certain vehicle type can be eliminated.

By means of the measures described and claimed herein, advantageous further developments and improvements of the pressure-medium-actuated brake system according to the invention can be implemented.

Particularly preferable measures provide that a first shuttle valve and a second shuttle valve are provided, the first shuttle valve switching the larger supply pressure of the supply pressures of the first and second compressed-air reservoirs, which are present at its inputs, through to a supply pressure input of the control valve device (pressure control module), and the second shuttle valve switching the control signal with the larger pressure of the first and second pneumatic control signals, which are present at its inputs, through to a control pressure input of the control valve device. The first and the second shuttle valve are then integrated as additional elements arranged in the direct vicinity of the multiple-circuit braking power sensor and of the control valve device (pressure control module) into the constructional unit.

According to a further development of this measure, it is provided that the inputs of the first shuttle valve are connected without intermediately arranged lines or conduits directly to a supply pressure input of a rear-axle duct and a supply pressure input of a front-axle duct of the multiple-circuit braking power sensor, and that the inputs of the second shuttle valve are connected without intermediately arranged lines or conduits directly to a control pressure output of the rear-axle duct and a control pressure output of the front-axle duct of the multiple-circuit braking power sensor. As a result, additional lines or conduits can be saved and an extremely compact constructional unit can be achieved.

According to another embodiment, as an additional element arranged directly adjacent to the multiple-circuit braking power sensor, to the control valve device (pressure control module) and to the first and second shuttle valve, the tractor protection valve can be integrated in the constructional unit.

As an additional element arranged in the direct vicinity of the multiple-circuit braking power sensor, of the control valve device (pressure control module), of the first and second shuttle valve and of the tractor protection valve, a brake light switch can be integrated in the constructional unit.

As an alternative, an additional element arranged in the direct vicinity of the multiple-circuit braking power sensor, of the control valve device (pressure control module), of the first and second shuttle valve and of the tractor protection valve, a rapid-release valve, which is arranged behind the tractor protection valve, for the rapid reduction of trailer brake pressure can be integrated in the constructional unit.

The communication between the electronic controlling and regulating device and the above-mentioned elements of the constructional unit or between the elements among one another can take place by using a data bus and/or by using analog electric signals.

According to another embodiment, as an additional element arranged in the direct vicinity of the multiple-circuit braking power sensor, of the control valve device (pressure control module), of the first and second shuttle valve and of the tractor protection valve, the electronic controlling and regulating unit can be integrated in the constructional unit, which can also take over the function of a brake light switch.

The above-mentioned structural elements and components can also be arbitrarily mutually combined in a different manner to form a compact constructional unit. The elements of the constructional unit are preferably accommodated in a separate housing at whose outer housing wall connections for the releasable fastening of the electric lines and pneumatic conduits are provided which lead to and from the constructional unit.

BRIEF DESCRIPTION OF THE DRAWINGS

An embodiment of the invention is illustrated in the drawings and will be explained in detail in the following description.

DETAILED DESCRIPTION OF THE DRAWINGS

Figure 1:
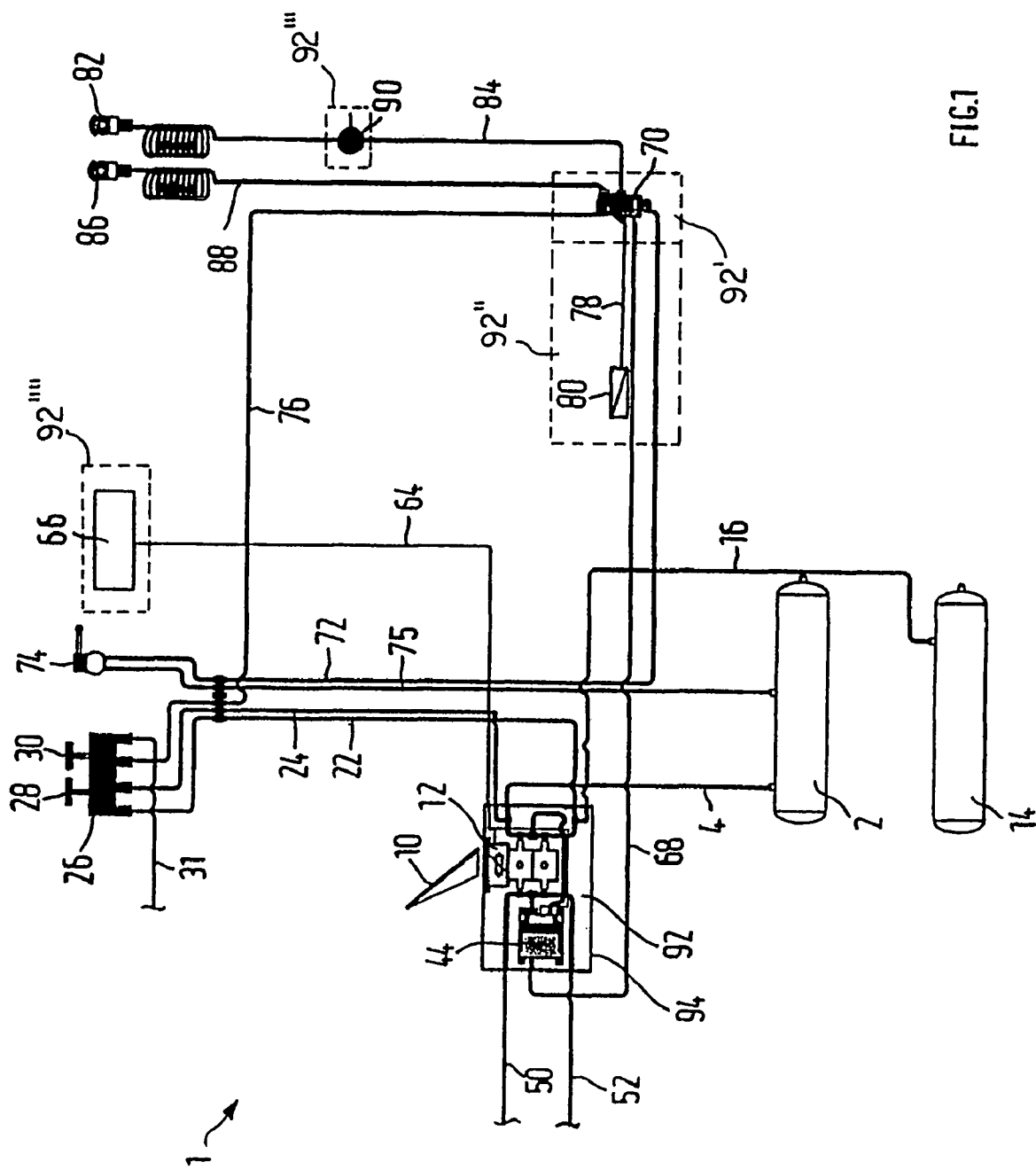
FIG. 1 is a view of a schematic wiring diagram of a preferred embodiment of the pressure-medium-actuated vehicle brake system according to the invention.

For reasons of scale, only the tractor-side part of a preferred embodiment of a pressure-medium-actuated brake system of a tractor-trailer combination which, in its entirety, has the reference number 1 in FIG. 1, by which the brakes of the trailer are controlled, is illustrated. The brake system 1 is electronically controlled, with first-priority electro-pneumatic brake circuits and with second-priority pneumatic retention circuits as a back-up safety measure.

Figure 2:
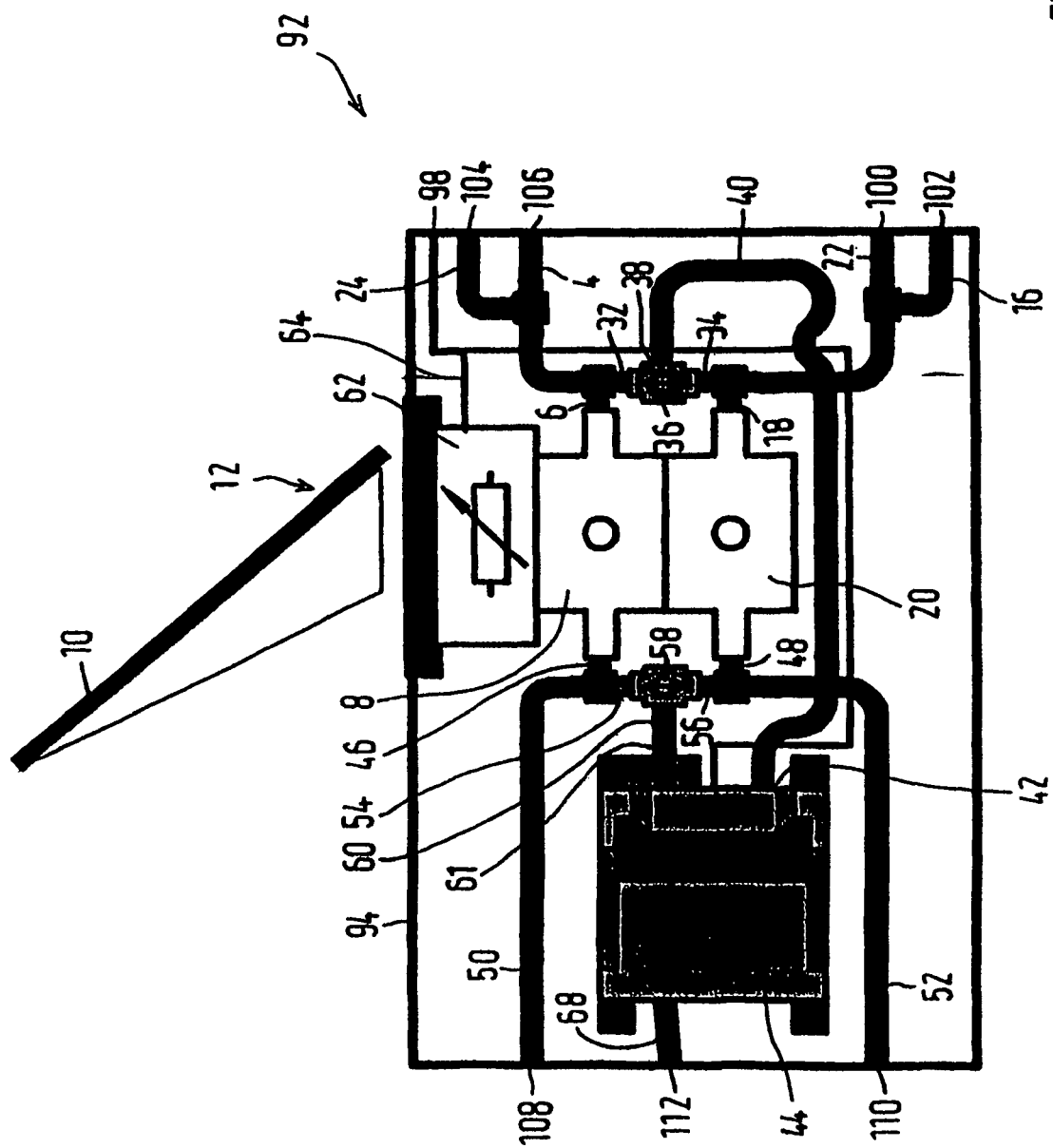
FIG. 2 is a view of an enlarged cut-out of FIG. 1.

A compressed-air reservoir 2 for the front axle is connected by a supply pressure conduit 4 with a supply pressure input 6 of a front axle duct 8 of a service brake valve 12, which can be actuated by means of a brake pedal 10, as best illustrated by FIG. 2. Likewise, a compressed-air reservoir 14 for the rear axle is connected by a supply pressure conduit 16 with a supply pressure input 18 of a rear axle duct 20 of the service brake valve 12. One additional supply pressure conduit 22, 24 respectively, which leads to a modular control valve 26, branches off each of the two supply pressure conduits 4, 16. The modular control valve 26 is, for example, a control valve of the MV-3 type of the firm AlliedSignal Truck Brake Systems Co. with two manually movable control buttons—a left control button 28 and a right control button 30 (in each case, relative to the representation of FIG. 1). A pressure conduit 31 connected with a parking brake of the rear axle branches off the modular control valve 26.

The two supply pressure conduits 4, 16 are also connected on the end side with inputs 32, 34 of a first shuttle valve 36 arranged, for example, without intermediately arranged conduits directly at the supply pressure inputs 6, 18 of the rear-axle duct 20 and of the front axle duct 8, of which an output 38 is connected by a supply pressure conduit 40 with a supply pressure input 42 of a control valve device for the brake system of the trailer. The control valve device is constructed as a pressure control module 44. Control pressure outputs 46, 48 of the front-axle duct 8 and of the rear-axle duct 20 of the service brake valve 12 are connected with one control pressure conduit 50, 52 respectively, by which pressure control modules of the front axle and of the rear axle are controlled (which are not shown for reasons of clarity). Furthermore, the two control pressure conduits 50, 52 are connected on the end side with inputs 54, 56 of a second shuttle valve 58 arranged, for example, without intermediately arranged conduits directly at the control pressure outputs 46, 48 of the rear-axle duct 20 and of the front-axle duct 8 and connected there, from which second shuttle valve 58, a control pressure conduit 60 leads to a control pressure input 61 of the pressure control module 44 of the trailer.

As a function of the force by which the driver of the tractor actuates the brake pedal 10, proportional control pressure signals are controlled from the supply pressures present on the supply side into the control pressure conduits 50, 52 of the front axle and of the rear axle in order to generate a brake pressure for brake cylinders of the front axle and of the rear axle in the corresponding pressure control modules. In this case, the two first and second shuttle valves 36, 58 arranged on the supply side and the control side, respectively, in each case control the larger supply pressure and the larger control pressure respectively through to the supply pressure conduit 40 and the control pressure conduit 60 of the trailer pressure control module 44 respectively. In the event of a complete or partial failure of the supply pressure and of the control pressure of the front axle respectively, as a result of the switch-over of the first and second shuttle valves 36, 58, the supply pressure and the storage pressure of the rear axle respectively causes the build-up of the supply pressure and of the control pressure of the trailer pressure control module 44 and vice-versa, which results in a pneumatic redundancy.

In addition, when the brake pedal 10 is actuated, in an electric part 62 of the service brake valve 12, a proportional electric control signal is generated and is guided, preferably by way of a data bus 64, to a central electronic controlling and regulating unit 66 which, in turn, by way of the data bus 64, controls the pressure control module 44 of the trailer. As a function of the electric control signals of the controlling and regulating unit 66, a modulated control pressure is generated in the pressure control module 44 of the trailer and is controlled by way of a control pressure conduit 68 on the input side into a tractor protection valve 70 known per se.

The tractor protection valve 70 is, for example, a tractor protection valve of the TP-5 type of the firm AlliedSignal Truck Brake Systems Co., U.S.A. On the input side, the tractor protection valve 70 is, in addition, connected with a control pressure conduit 72 through which, via a hand control valve 74, a control pressure is advanced which is generated from the supply pressure of a compressed-air reservoir 2 fed by a supply pressure conduit 75. When manually actuating the hand brake valve 74, the driver can trigger an anti-jack-knife braking of the trailer when the latter is, for example, in an oblique position with respect to the tractor. In addition, the tractor protection valve 70, on the input side, is connected with a supply pressure conduit 76 extending from the modular control valve 26. Finally, by way of the line 78, a brake light switch 80, preferably constructed as a pressure switch, is connected to the tractor protection valve 70 in order to generate a signal for actuating the brake light in the event of a braking.

A relay valve is integrated in the tractor protection valve 70. By means of this relay valve, a brake control pressure is to be controlled from the supply pressure present in the supply pressure conduit 76 and from the control pressure advanced from the pressure control module 44 of the trailer into an output-side brake conduit 84 connected to a "brake" coupling head 82, and a supply pressure is to be controlled into an output-side supply pressure conduit 88 connected to a "supply" coupling head 86. In the brake conduit 84, a rapid-release valve 90 for the fast bleeding of the trailer brake conduit 84 during the termination of a braking operation is situated between the tractor protection valve 70 and the "brake" coupling head 82. The two coupling heads 82, 86 can be coupled with assigned coupling heads of the trailer, which are connected with a not shown trailer part of the brake system 1 of the tractor-trailer combination, such as a trailer brake valve. In addition, the tractor protection valve 70 prevents, in a known manner, the flowing of compressed air out of the two compressed-air reservoirs 2, 14, when the compressed-air connections to the trailer break away.

With respect to the spatial relationship, according to the embodiment shown in FIG. 1 and FIG. 2, the pressure control module 44 of the trailer, the first and the second shuttle valves 36, 58, as well as the service brake valve 12, are arranged at a narrow distance from one another and close to one another. Together they form a compact constructional unit 92 which can be preassembled. This constructional unit 92 can be accommodated in a separate housing 94. On its exterior housing wall, connections are provided for the releasable fastening of the electric lines and pneumatic conduits extending away from the construction unit 92. Specifically, an electric connection 98 is provided for the data bus 64 extending to and from the controlling and regulating unit 66, as well as two rear-axle supply pressure connections 100, 102 are provided for the two supply pressure conduits 16, 22, as well as two front-axle supply pressure connections 104, 106 for the two supply pressure conduits 4, 24, a front-axle control pressure connection 108 for the-control pressure conduit 50, a rear-axle control pressure connection 110 for the control pressure conduit 52, and a trailer control pressure connection 112 for the control pressure conduit 68. The control pressure conduit 60 and the supply pressure conduit 40 for the trailer pressure control module 44 are accommodated completely in the housing 94. As an alternative, the above-mentioned structural elements can also be integrated in a housing block, the pneumatic conduits and/or electric lines of the structural elements with the connections or among one another being implemented by bores or ducts constructed within the housing block.

Since the two shuttle valves 36, 58 are connected directly to the control pressure outputs 46, 48 and to the supply pressure inputs 6, 18 respectively of the service brake valve 12, no additional connection conduits are required. In the case of the pressure control module 44 of the trailer, only a very short supply pressure conduit 40 and control pressure conduit 60 are in each case provided as a result of the direct proximity of the service brake valve 12.

The two compressed-air reservoirs 2, 14, the electric part 62 of the service brake valve 12, the central electronic controlling and regulating unit 66, the pressure control module 44 of the trailer, the tractor protection valve 70 as well as the trailer part, which is not shown, of the brake system of the tractor-trailer combination together form an electro-pneumatic brake circuit. The electro-pneumatic brake circuit partially overlaps with a purely pneumatic brake circuit which comprises the two compressed-air reservoirs 2, 14, the front-axle duct 8 and the rear-axle duct 20 of the service brake valve 12, the pressure control module 44 of the trailer, the tractor protection valve 70 as well as the trailer part of the brake system of the tractor-trailer combination. The pneumatic brake circuit, in turn, consists of a pneumatic front-axle brake circuit with the compressed-air reservoir 2 for the front axle, the front-axle duct 8 of the service brake valve 12 as well as pneumatic structural elements arranged on the output side, and of a pneumatic rear-axle brake circuit with the compressed-air reservoir 14 for the rear axle, the rear-axle duct 20 of the service brake valve 12 as well as pneumatic structural elements arranged on the output side.

The circuit logic of the pressure control module 44 of the trailer processes the electric control signals of the electro-pneumatic brake circuit, which are generated by the controlling and regulating unit 66, with priority before the control pressure signals of the pneumatic brake circuit which, as a retention brake circuit, exercises a redundant control function if there is an interference with the electro-pneumatic brake circuit. In this case, the output control pressure of the pressure control module 44 of the trailer is formed as a function of the control pressure fed by the second shuttle valve 58, as mentioned above, this shuttle valve 58, switching the larger of the control pressures of the front axle and of the rear axle through to the pressure control module 44 of the trailer, whereby another redundancy is provided.

Therefore, when the brake pedal 10 of the service brake valve 12 is actuated by the driver, as a function of the electric control signals advanced from the central electronic controlling and regulating unit 66 by way of the data bus 64, or when the electro-pneumatic control circuit fails, as a function of the control pressure in the pressure control module 44 in the trailer advanced by way of the pneumatic control pressure conduit 60, a control pressure is generated which is present at the tractor protection valve 70 and from which a brake pressure is modulated which is controlled by way of the pneumatic brake conduit 84 into the "brake" coupling head 82 connected on the output side.

By means of the modular control valve 26, which is arranged in the area of the dashboard of the tractor, the driver can manually control the brake system 1 depending on whether the two control buttons 28, 30 are moved into a retracted or extended position. If both control buttons 28, 30 are in the extended position, the parking brake is activated by bleeding in the case of the tractor as well as in the case of the trailer. If then, starting from the parked condition of the tractor-trailer combination, it is desired to release only the trailer brakes, the left control button 28 is moved into the retracted position, while the right control button 30 remains in the extended position, whereby only the trailer brakes are pressurized, while the tractor brakes remain closed. If, in addition, the right control button 30 is also moved into the retracted position, the tractor brakes as well as the trailer brakes are in the release position. For the exclusive activation of the trailer brakes, the left control button 28 is moved into the extended position in order to bleed the supply pressure conduit 76 leading to the tractor protection valve 70.

According to another embodiment of the invention, the service brake valve 12, the pressure control module 44 of the trailer, the first and the second shuttle valve 36, 58 as well as the tractor protection valve 70 can be arranged in the direct vicinity of one another and can be combined in a constructional unit accommodated in a housing (see phantom box 92'). Additionaliy, the brake light switch 80 can be integrated in this constructional unit (see phantom box 92").

As an alternative, the service brake valve 12, the pressure control module 44 of the trailer, the first and the second shuttle valve 36, 58, the tractor protection valve 70 as well as the rapid-release valve 90 (see vhantom box 92′″) can be arranged in the immediate vicinity of one another and can be combined to a constructional unit accommodated in a housing.

The electric communication between the modules and structural elements combined in the constructional unit among one another, or between them and the electronic controlling and regulating unit 66, preferably takes place by way of the data bus 64. As an alternative or in addition, it can also take place by analog electric signals.

As another alternative, the service brake valve 12, the pressure control module 44 of the trailer, the first and the second shuttle valve 36, 58, the tractor protection valve 70 as well as the electronic controlling and regulating unit 66 (see phantom box 92″″) can be arranged in the direct vicinity of one another and can be combined into a constructional unit accommodated in a housing. The function of the brake light switch 80 can then be integrated in the controlling and regulating unit 66.

TABLE OF REFERENCE NUMBERS

1 Brake system
2 compressed-air reservoir
4 supply pressure conduit
6 supply pressure input
8 front-axle duct
10 brake pedal
12 service brake valve
14 compressed-air reservoir
16 supply pressure conduit
18 supply pressure input
20 rear-axle duct
22 supply pressure conduit
24 supply pressure conduit
26 modular control valve
28 left control button
30 right control button
31 pressure conduit
32 input
34 input
36 first shuttle valve
38 output
40 supply pressure conduit
42 supply pressure input
44 pressure control module of trailer
46 control pressure output
48 control pressure output
50 control pressure conduit
52 control pressure conduit
54 input
56 input
58 second shuttle valve
60 control pressure conduit
61 control pressure input
62 electric part
64 data bus
66 controlling and regulating unit
68 control pressure conduit
70 tractor protection valve
72 control pressure conduit
74 hand brake valve
75 supply pressure conduit
76 supply pressure conduit
78 line
80 brake light switch
82 "brake" coupling head
84 brake conduit
86 "supply" coupling head
88 supply pressure conduit
90 rapid-release valve
92 constructional unit
94 housing
98 electric connection
100 rear-axle supply pressure connection
102 rear-axle supply pressure connection
104 front-axle supply pressure connection
106 front-axle supply pressure connection
108 front-axle control pressure connection
110 rear-axle control pressure connection
112 trailer control pressure connection

The invention claimed is:

1. A pressure-medium-actuated brake system of a tractor-trailer combination, having at least a first brake circuit and a second brake circuit, and comprising:
   a) a multiple-circuit braking power sensor connected to a first compressed-air reservoir for the first brake circuit and to a second compressed-air reservoir for the second brake circuit, the multiple-circuit braking power sensor generating, as a function of a driver's desire, at least a first pneumatic control signal assigned to the first brake circuit, at least a second pneumatic control signal assigned to the second brake circuit, as well as electric signals,
   b) an electronic controlling and regulating unit by which electric control signals can be generated as a function of the electric signals of the multiple-circuit braking power sensor,
   c) a control valve device which is controllable with a first priority as a function of the electric control signals of the controlling and regulating unit and with a second priority as a function of at least one of the first pneumatic control signal and the second pneumatic control signal for generating a modulated control pressure,
   d) a tractor protection valve which is connectable with at least one of said first and second compressed-air reservoirs and, by which, a supply pressure and, as a function of the modulated control pressure, also a brake pressure can be modulated for a brake system of the trailer,
   e) wherein at least the multiple-circuit braking power sensor and the control valve device are arranged in a direct vicinity of one another and are combined into a constructional unit; and
   wherein a first shuttle valve and a second shuttle valve are provided, the first shuttle valve switching a larger one of the supply pressures of the first and second compressed-air reservoirs, which are present at its inputs, through to a supply pressure input of the control valve device, and the second shuttle valve switching the control signal with the larger pressure of the first and second pneumatic control signals, which are present at its inputs, through to a control pressure input of the control valve device.

2. The pressure-medium-actuated brake system according to claim 1, wherein the first and the second shuttle valves are integrated as additional elements arranged in the direct vicinity of the multiple-circuit braking power sensor and of the control valve device into the constructional unit.

3. The pressure-medium-actuated vehicle brake system according to claim 2, wherein the inputs of the first shuttle valve are connected without intermediately arranged lines or conduits directly to a supply pressure input of a rear-axle duct and a supply pressure input of a front-axle duct of the multiple-circuit braking power sensor, and wherein the inputs of the second shuttle valve are connected without intermediately arranged lines or conduits directly to a control pressure output of the rear-axle duct and a control pressure output of the front-axle duct of the multiple-circuit braking power sensor.

4. The pressure-medium-actuated vehicle brake system according to claim 3, wherein the tractor protection valve is integrated into the constructional unit as an additional element arranged in the direct vicinity of the multiple-circuit braking power sensor, the control valve device and the first and second shuttle valves.

5. The pressure-medium-actuated vehicle brake system according to claim 3, wherein a rapid-release valve, which is arranged behind the tractor protection valve, for rapidly reducing trailer brake pressure, is integrated into the constructional unit as an additional element arranged in the direct vicinity of the multiple-circuit braking power sensor, the control valve device, the first and second shuttle valve and the tractor protection valve.

6. The pressure-medium-actuated vehicle brake system according to claim 3, wherein the electronic controlling and regulating unit is integrated into the constructional unit as an additional element arranged in the direct vicinity of the multiple-circuit braking power sensor, the control valve device, the first and second shuttle valve and the tractor protection valve.

7. The pressure-medium-actuated vehicle brake system according to claim 2, wherein the tractor protection valve is integrated into the constructional unit as an additional element arranged in the direct vicinity of the multiple-circuit braking power sensor, the control valve device and the first and second shuttle valves.

8. The pressure-medium-actuated vehicle brake system according to claim 1, wherein the tractor protection valve is integrated into the constructional unit as an additional element arranged in the direct vicinity of the multiple-circuit braking power sensor, the control valve device and the first and second shuttle valves.

9. The pressure-medium-actuated vehicle brake system according to claim 8, wherein a brake light switch is integrated into the constructional unit as an additional element arranged in the direct vicinity of the multiple-circuit braking power sensor, the control valve device, the first and second shuttle valve and the tractor protection valve.

10. The pressure-medium- actuated vehicle brake system according to claim 9, wherein a rapid-release valve, which is arranged behind the tractor protection valve, for rapidly reducing trailer brake pressure, is integrated into the constructional unit as an additional element arranged in the direct vicinity of the multiple-circuit braking power sensor, the control valve device, the first and second shuttle valve and the tractor protection valve.

11. The pressure-medium-actuated vehicle brake system according to claim 9, wherein the electronic controlling and regulating unit is integrated into the constructional unit as an additional element arranged in the direct vicinity of the multiple-circuit braking power sensor, the control valve device, the first and second shuttle valve and the tractor protection valve.

12. The pressure-medium-actuated vehicle brake system according to claim 1, wherein a rapid-release valve, which is arranged behind the tractor protection valve, for rapidly reducing trailer brake pressure, is integrated into the constructional unit as an additional element arranged in the direct vicinity of the multiple-circuit braking power sensor, the control valve device, the first and second shuttle valve and the tractor protection valve.

13. The pressure-medium-actuated vehicle brake system according to claim 1, wherein the electronic controlling and regulating unit is integrated into the constructional unit as an additional element arranged in the direct vicinity of the multiple-circuit braking power sensor, the control valve device, the first and second shuttle valve and the tractor protection valve.

14. The pressure-medium-actuated vehicle brake system according to claim 1, wherein communication between the electronic controlling and regulating unit and components of the constructional unit, or between the components takes place by way of at least one of a data bus and analog electric signals.

15. The pressure-medium-actuated vehicle brake system according to claim 1, wherein components of the constructional unit are accommodated in a separate housing, connections for a releasable fastening of electric lines and pneumatic conduits leading to and from the constructional unit being provided in an exterior housing wall of the separate housing.

16. A pressure-medium-actuated brake system of a tractor-trailer combination, having at least a first brake circuit and a second brake circuit, and comprising:
  a) a multiple-circuit braking power sensor connected to a first compressed-air reservoir for the first brake circuit and to a second compressed-air reservoir for the second brake circuit, the multiple-circuit braking power sensor generating, as a function of a driver's desire, at least a first pneumatic control signal assigned to the first brake circuit, at least a second pneumatic control signal assigned to the second brake circuit, as well as electric signals,
  b) an electronic controlling and regulating unit by which electric control signals can be generated as a function of the electric signals of the multiple-circuit braking power sensor,
  c) a control valve device which is controllable with a first priority as a function of the electric control signals of the controlling and regulating unit and with a second priority as a function of at least one of the first pneumatic control signal and the second pneumatic control signal for generating a modulated control pressure,
  d) a tractor protection valve which is connectable with at least one of said first and second compressed-air reservoirs and, by which, a supply pressure and, as a function of the modulated control pressure, also a brake pressure can be modulated for a brake system of the trailer,
  e) wherein at least the multiple-circuit braking power sensor and the control valve device are arranged in a direct vicinity of one another and are combined into a constructional unit; and
  wherein the electronic controlling and regulating unit is integrated into the constructional unit as an additional element arranged in the direct vicinity of the multiple-circuit braking power sensor, the control valve device, a first and a second shuttle valve and the tractor protection valve, the first shuttle valve switching a larger one of the supply pressures of the first and second compressed-air reservoirs, which are present at its inputs, through to a supply pressure input of the control valve device, and the second shuttle valve switching the control signal with the larger pressure of the first and second pneumatic control signals, which are present at its inputs, through to a control pressure input of the control valve device.

17. The pressure-medium-actuated vehicle brake system according to claim 16, wherein a function of a brake light switch is integrated in the electronic controlling and regulating unit.

* * * * *